US008876395B2

(12) United States Patent  
Sakaguchi

(10) Patent No.: US 8,876,395 B2  
(45) Date of Patent: Nov. 4, 2014

(54) BALL BEARING WITH RETAINER

(75) Inventor: Kenta Sakaguchi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/820,637

(22) PCT Filed: Aug. 29, 2011

(86) PCT No.: PCT/JP2011/069374  
§ 371 (c)(1),  
(2), (4) Date: Mar. 4, 2013

(87) PCT Pub. No.: WO2012/043106  
PCT Pub. Date: Apr. 5, 2012

(65) Prior Publication Data  
US 2013/0163909 A1 Jun. 27, 2013

(30) Foreign Application Priority Data  
Sep. 28, 2010 (JP) ................................. 2010-217029

(51) Int. Cl.  
F16C 33/41 (2006.01)  
F16C 33/38 (2006.01)  
F16C 33/66 (2006.01)  
F16C 19/06 (2006.01)

(52) U.S. Cl.  
CPC ........... *F16C 33/3887* (2013.01); *F16C 33/416* (2013.01); *F16C 2240/80* (2013.01); *F16C 33/418* (2013.01); *F16C 33/6614* (2013.01); F16C 19/06 (2013.01)  
USPC .......................................... 384/531; 384/470

(58) Field of Classification Search  
USPC .......................................... 384/470, 523–534  
See application file for complete search history.

(56) References Cited

U.S. PATENT DOCUMENTS 4,493,513 A 1/1985 Osawa et al.  
5,575,569 A * 11/1996 Shinohara ..................... 384/470

(Continued)

FOREIGN PATENT DOCUMENTS

| JP | 58-195118 | 12/1983 |
| JP | 9-317775 | 12/1997 |
| JP | 2003-013962 | 1/2003 |
| JP | 2003-214437 | 7/2003 |
| JP | 2010-156439 | 7/2010 |

OTHER PUBLICATIONS

International Search Report issued Nov. 8, 2011 in International (PCT) Application No. PCT/JP2011/069374.

(Continued)

Primary Examiner — Thomas R. Hannon  
(74) Attorney, Agent, or Firm — Wenderoth, Lind & Ponack, L.L.P.

(57) ABSTRACT

A retainer for a ball bearing and a ball bearing have reduced torque even in grease lubrication. The retainer includes a retainer body which has an annular shape and has recesses formed in one axial end surface thereof along a peripheral direction at predetermined pitches and a pair of claw portions provided to protrude from opening ends of each of the recesses, the opening ends being opposed to each other in the peripheral direction. Each of the recesses and the pair of claw portions form a pocket in which a ball is received. A pocket has a PCD which is set smaller than a PCD of the ball to be received in the pocket.

24 Claims, 8 Drawing Sheets

(56) References Cited

U.S. PATENT DOCUMENTS

| | | | |
|---|---|---|---|
| 5,642,945 A * | 7/1997 | Abe | 384/470 |
| 5,806,990 A | 9/1998 | Ueno et al. | |
| 6,371,652 B1 * | 4/2002 | Koyama et al. | 384/470 |
| 6,371,655 B1 * | 4/2002 | Fierling | 384/523 |
| 6,612,748 B1 * | 9/2003 | Funatsu et al. | 384/531 |
| 7,114,852 B2 * | 10/2006 | Compassi | 384/470 |
| 8,523,450 B2 * | 9/2013 | Maejima et al. | 384/531 |
| 2002/0114550 A1 * | 8/2002 | Daikuhara | 384/470 |
| 2009/0129716 A1 * | 5/2009 | Oya et al. | 384/572 |
| 2010/0142874 A1 * | 6/2010 | Doyer et al. | 384/523 |

OTHER PUBLICATIONS

International Preliminary Report on Patentability and Written Opinion of the International Searching Authority issued Apr. 25, 2013 in International (PCT) Application No. PCT/JP2011/069374.

* cited by examiner

US 8,876,395 B2

BALL BEARING WITH RETAINER

TECHNICAL FIELD

The present invention relates to a synthetic resin retainer for a ball bearing, which is configured to retain balls rollably, and relates to a ball bearing in which the retainer is interposed between an outer race and an inner race.

BACKGROUND ART

As rolling bearings built into automotive electrical parts and accessories such as a fan coupling device, an alternator, an idler pulley, an electromagnetic clutch for a car air-conditioner, and an electric fan motor, ball bearings such as a deep groove ball bearing and an angular contact ball bearing are widely used in order to rotatably support, to a stationary member, a rotation shaft which is rotationally driven by output of an engine.

In general, as illustrated in FIG. 11, a ball bearing includes an inner race 1, an outer race 2, balls 3 interposed between the inner race 1 and the outer race 2, and a retainer 4 for retaining the balls 3. Further, as the retainer, a resin crown-shaped retainer is sometimes used. The resin crown-shaped retainer 4 is made of a resin excellent in abrasion resistance, seizure resistance, and the like. As illustrated in FIG. 12, the resin crown-shaped retainer 4 includes a retainer body 5 having an annular shape and including: recesses 7 formed in one axial end surface 6 of the two axial end surfaces 6 and 10 of the retainer body 5 along a peripheral direction at predetermined pitches; and a pair of claw portions 8, 8 provided to protrude from opening ends of each of the recesses 7, the opening ends being opposed to each other in the peripheral direction. Each of the recesses 7 and the pair of claw portions 8, 8 form a pocket 9 in which each of the balls 3 is received.

By the way, the rolling bearing is required to achieve reduction in torque. Various bearings specified for reduction in torque have been proposed (Patent Literatures 1 and 2). Patent Literatures 1 and 2 disclose the following retainer. Specifically, the retainer is formed in such a manner that a pair of pressed plates is fastened together by fastening means. Recesses for a pocket are formed in an inner surface of each of the pressed plates, and the opposing recesses for a pocket form pockets in which balls as rolling elements are fitted. Further, in an inner surface of each of the recesses for a pocket, a recess or the like is formed as a lubricant (grease) reservoir.

CITATION LIST

Patent Literature 1: JP 2003-13962 A Patent Literature 2: JP 09-317775 A

SUMMARY OF INVENTION

Technical Problems

By the way, in the resin crown-shaped retainer 4 illustrated in FIG. 12, as illustrated in FIGS. 13 and 14, a pitch circle diameter (PCD) ($P_{PCD}$) of each pocket 9 is set equal to a PCD ($B_{PCD}$) of each ball 3 to be received in the pocket 9. Further, a diameter ($D_B$) of the ball is smaller than a diameter ($D_P$) of the pocket.

Accordingly, a relationship illustrated in FIG. 15 is established between the pocket 9 and the ball 3. That is, a gap is formed between the ball 3 and each pocket edge portion 15 situated on a radially inner side of the pocket and between the ball 3 and each pocket edge portion 16 situated on a radially outer side of the pocket. Thus, the pocket edge portions 15, 16 scrape off a grease that adheres to the ball, and hence the grease is more likely to be interposed between the ball 3 and a raceway surface of the inner race and between the ball and a raceway surface of the outer race. As a result, torque may be increased.

Further, in Patent Literatures 1 and 2 above, it is possible to reduce a slide-contact area between the ball and the pocket of the retainer, and hence reduction in torque can be achieved. However, in grease lubrication, the grease is collected in the recesses, and the grease always adheres to the ball. Thus, the grease is more likely to be interposed between the ball 3 and the raceway surface of the inner race and between the ball and the raceway surface of the outer race. As a result, torque may be increased.

Therefore, in view of the above-mentioned circumstances, the present invention provides a retainer for a ball bearing, and a ball bearing which are capable of obtaining an effect of reducing torque even in grease lubrication.

Solution to Problems

According to the present invention, there is provided a retainer for a ball bearing, comprising a retainer body which has an annular shape and comprises: recesses formed in one axial end surface of the retainer body along a peripheral direction at predetermined pitches; and a pair of claw portions provided to protrude from opening ends of each of the recesses, the opening ends being opposed to each other in the peripheral direction, the each of the recesses and the pair of claw portions forming a pocket in which a ball is received, wherein the pocket has a PCD which is set smaller than a PCD of the ball to be received in the pocket.

According to the retainer for a ball bearing of the present invention, the PCD of the pocket is set smaller than the PCD of the ball to be received in the pocket, and thus the pocket can be situated on a radially inner side with respect to the ball. With this configuration, pocket edge portions situated on a radially outer side of the pocket are close to the ball (the ball is held on the radially outer side of the pocket), and hence can scrape off a grease that adheres to the ball.

It is preferred that, when the PCD of the pocket is 0.9 to 0.99 times as large as the PCD of the ball, a diameter of the pocket be 1.06 times or less as large as a diameter of the ball. When the diameter of the pocket is more than 1.06 times as large as the diameter of the ball, the diameter of the pocket is extremely large, and hence a backlash may occur.

It is preferred that, when the PCD of the pocket is 0.9 to 0.99 times as large as the PCD of the ball, a diameter of the pocket be 1.03 times or more as large as a diameter of the ball. When the diameter of the pocket is less than 1.03 times as large as the diameter of the ball, the diameter of the pocket is extremely small, and hence a gap between the ball and the pocket is narrowed. As a result, abnormal abrasion and increase in stress may occur.

The retainer for a ball bearing may further comprise a grease reservoir formed on the one axial end surface side of the retainer body, on which the pair of claw portions is provided, at a position on a radially inner side and/or a radially outer side of a portion between pockets adjacent to each other along the peripheral direction.

The retainer for a ball bearing may further comprise a grease reservoir formed on another axial end surface side of the retainer body, on which no claw portions are provided, at a position on a radially inner side and/or a radially outer side of a portion between pockets adjacent to each other along the peripheral direction.

Thus, the grease reservoir is formed, and hence the grease is collected in the grease reservoir, with the result that it is possible to reduce a flow of the grease to raceway surfaces, which is caused by rolling elements (balls). In this manner, stirring resistance of the grease can be reduced.

As a material for the retainer, there may be used a polyamide 66 (PA66), a polyamide 46 (PA46), a polyamide 9T (PA9T), a polyamide 11 (PA11), or a polyamide 6 (PA6). Thus, as a material for the retainer, there is preferred a polyamide resin or the like excellent in tensile elongation, tensile strength, shock resistance, abrasion resistance, lubricity, and the like.

According to the present invention, there is provided a ball bearing, comprising: an inner race; an outer race; balls interposed between the inner race and the outer race; and a retainer for retaining the balls, wherein the above-mentioned retainer for a ball bearing is used as the retainer.

Advantageous Effects of Invention

According to the retainer for a ball bearing of the present invention, the pocket edge portions situated on the radially outer side of the pocket are close to the ball (the ball is held on the radially outer side of the pocket), and hence can scrape off the grease that adheres to the ball. Therefore, it is possible to obtain the effect of reducing torque even in grease lubrication.

It is preferred that, when the PCD of the pocket is 0.9 to 0.99 times as large as the PCD of the ball, a diameter of the pocket be 1.06 times or less as large as a diameter of the ball. Further, it is preferred that, when the PCD of the pocket is 0.9 to 0.99 times as large as the PCD of the ball, a diameter of the pocket be 1.03 times or more as large as a diameter of the ball. When the diameter of the pocket is 1.06 times or less as large as the diameter of the ball, a backlash can be reduced, and hence it is possible to obtain highly accurate rotation. When the diameter of the pocket is 1.03 times or more as large as the diameter of the ball, there is no risk of abnormal abrasion and increase in stress, and hence it is possible to obtain stable rotation for a long period of time.

The grease reservoir is formed, and hence it is possible to reduce stirring resistance of the grease, and to achieve further reduction in torque.

It is possible to use, as a material for the retainer, a polyamide resin excellent in tensile elongation, tensile strength, shock resistance, abrasion resistance, lubricity, and the like. Accordingly, it is possible to provide a high-quality retainer.

According to the ball bearing of the present invention, it is possible to provide a ball bearing capable of obtaining the effect of reducing torque even in grease lubrication. Therefore, the ball bearing of the present invention is most suitable as a ball bearing built into a fan coupling device, an alternator, an idler pulley, an electromagnetic clutch for a car air-conditioner, an electric fan motor, and the like.

DESCRIPTION OF EMBODIMENT

In the following, an embodiment of the present invention is described with reference to the drawings.

Figure 1:
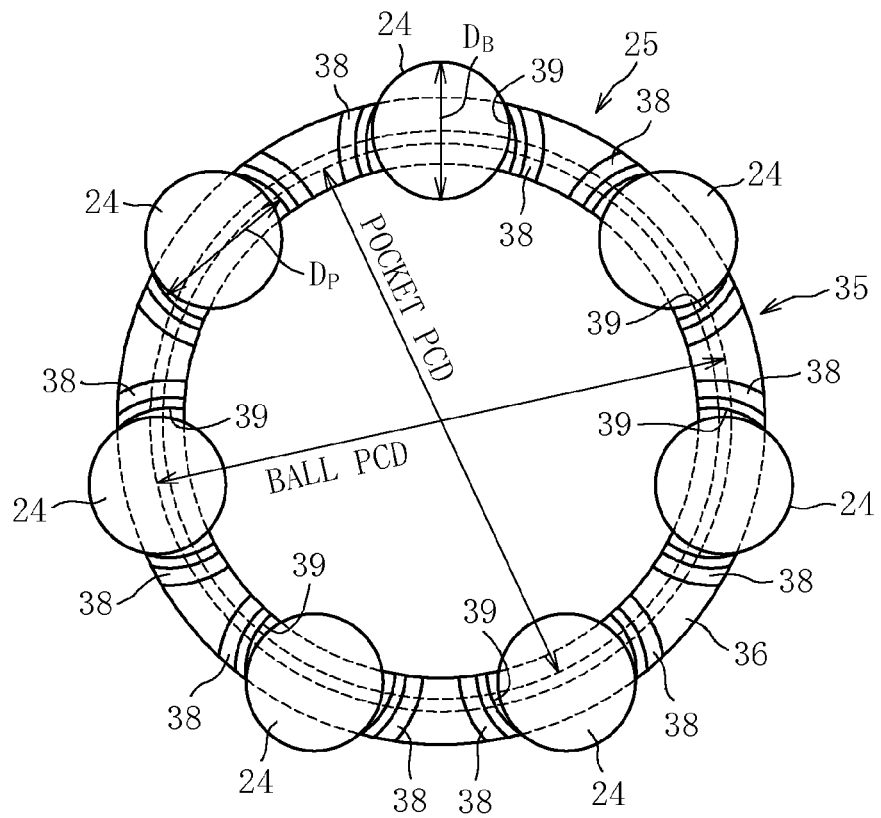
[FIG. 1] A plan view of a retainer for a ball bearing according to an embodiment of the present invention.
Figure 2:
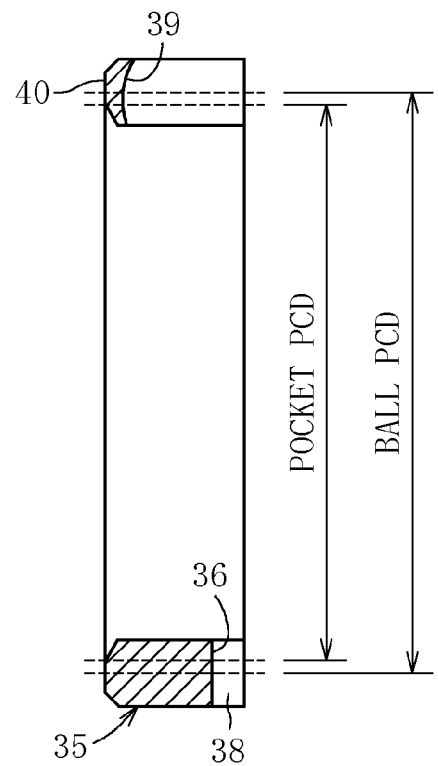
[FIG. 2] A cross-sectional view of the retainer for a ball bearing.
Figure 3:
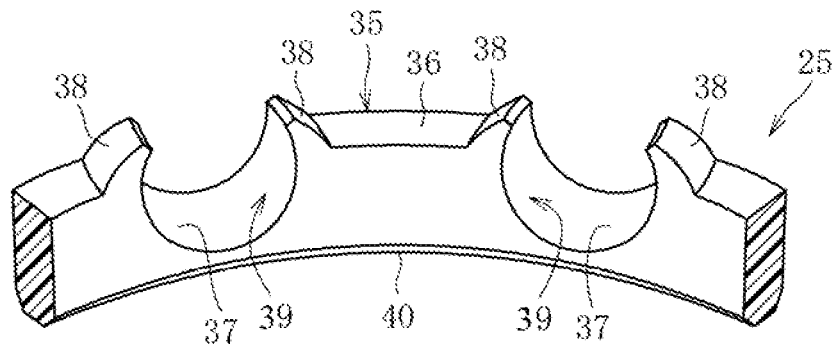
[FIG. 3] A perspective view of a main part of the retainer for a ball bearing.
Figure 4:
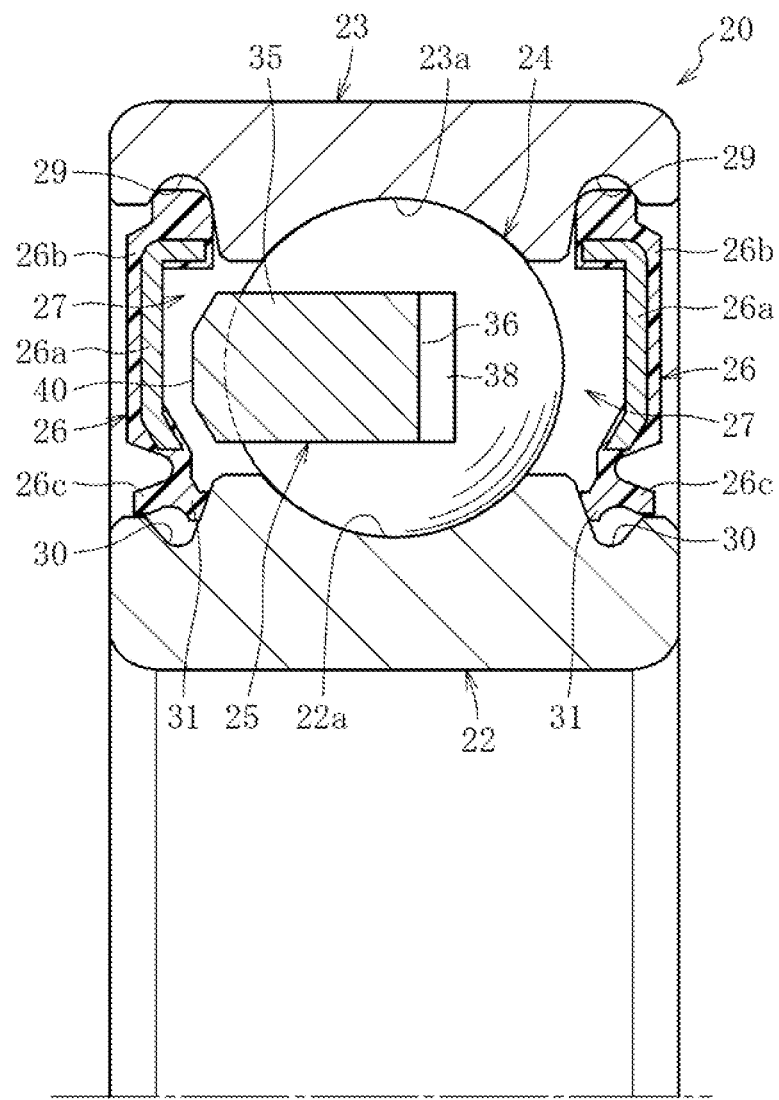
[FIG. 4] A cross-sectional view of a ball bearing using the retainer for a ball bearing.

FIGS. 1 to 3 illustrate a retainer for a ball bearing according to the present invention, and the retainer for a ball bearing is used in a ball bearing illustrated in FIG. 4. The ball bearing in the illustrated example is built into automotive electrical parts and accessories such as a fan coupling device, an alternator, an idler pulley, an electromagnetic clutch for a car air-conditioner, and an electric fan motor.

A ball bearing 20 according to this embodiment comprises the following as main components: an inner race 22 having an outer peripheral surface in which an inner raceway surface 22a is formed; an outer race 23 arranged on an outer side of the inner race 22 and having an inner peripheral surface in which an outer raceway surface 23a is formed; a plurality of balls 24 interposed between the inner raceway surface 22a of the inner race 22 and the outer raceway surface 23a of the outer race 23 so as to be rollable; a retainer 25 arranged between the inner race 22 and the outer race 23, for retaining the balls 24 equiangularly; and seal members 26 arranged between the inner race 22 and the outer race 23 on both axial end sides of the ball bearing, for hermetically sealing an annular space 27 formed between the inner race 22 and the outer race 23. A lubricant such as a grease is filled into the annular space 27 hermetically sealed by the seal members 26, and thus the balls 24 smoothly roll in pockets of the retainer 25.

In this embodiment, the outer race 23 is mounted to a stationary member such as a housing, and the inner race 22 is mounted to a rotation shaft that is rotationally driven by output of an engine. Each seal member 26 comprises an annular metal core 26a, and a rubber member 26b fixed to the metal core 26a integrally. An outer peripheral portion of the seal member 26 is fixed in a fitting state in a seal fitting groove 29 formed in the inner peripheral surface of the outer race 23. The inner race 22 comprises a seal groove 30 formed into a circumferential groove in a position corresponding to an inner peripheral portion of the seal member 26. A seal lip 31 formed at an inner peripheral end 26c of the seal member 26 is held in slide-contact with the seal groove 30 of the inner race 22. Note that, this embodiment exemplifies a bearing of an inner race rotation type. However, the present invention is also applicable to a bearing of an outer race rotation type in which the inner race 22 is mounted to a stationary member such as a shaft, and the outer race 23 is mounted to a rotation shaft.

During operation of the ball bearing 20, the inner race 22 rotates while the seal lip 31 formed at a nib of the seal member 26 keeps slide-contact with an outer peripheral end portion of the inner race 22. In this manner, intrusion of foreign matters, such as water and dust, into an inside of the bearing, or leakage of the lubricant from the inside of the bearing to an outside thereof is prevented.

As illustrated in FIGS. 1 to 3, the retainer 25 comprises a retainer body 35 which has an annular shape and comprises: recesses 37 formed in one axial end surface 36 of the retainer body 35 along a peripheral direction at predetermined pitches; and claw portions 38 provided to protrude from opening ends of each of the recesses 37 of the retainer body 35, the opening ends being opposed to each other in the peripheral direction. Each of the recesses 37, and the pair of claw portions 38, 38 protruding from the opening ends form a pocket 39 for retaining each ball 24.

The retainer 25 may be made of this kind of generally used resin excellent in abrasion resistance, seizure resistance, and the like, and examples thereof include synthetic resins such as a polyethylene, a polyamide, a polyacetal, a polyethylene terephthalate, a polybutylene terephthalate, a polycarbonate, a polyphenylene sulfide, a polyether sulfone, a polyether imide, a polyamide imide, a polyether ether ketone, a thermoplastic polyimide, a thermosetting polyimide, an epoxy resin, and a phenol resin. Further, it is possible to adopt one including a thermoplastic resin such as a polyamide, a polyphenylene sulphide, or a polyether ether ketone as a base material and glass fiber added for strength improvement and dimensional stability.

However, in the present invention, a polyamide resin excellent in tensile elongation, tensile strength, shock resistance, abrasion resistance, lubricity, and the like is preferred as the material for the retainer 25. Examples of the polyamide resin may include a polyamide 66 (PA66), a polyamide 46 (PA46), a polyamide 9T (PA9T), a polyamide 11 (PA11), and a polyamide 6 (PA6). As described above, according to the present invention, it is possible to use, as a material for the retainer, a polyamide resin excellent in tensile elongation, tensile strength, shock resistance, abrasion resistance, lubricity, and the like. Accordingly, it is possible to provide a high-quality retainer. Note that, the outer race 23, the inner race 22, and the ball 24 are made of a metal such as bearing steel and carburized steel.

In addition, grease to be filled in the ball bearing is a semisolid lubricant formed of a base oil, a thickening agent, and an additive. The base oil constituting the lubricating grease is not particularly limited as long as it is an oil generally used as base oil of lubricating grease, and examples thereof include: mineral oils such as a paraffin-based mineral oil and a naphthene-based mineral oil; hydrocarbon-based synthetic oils such as a polybutene, a poly-α-olefin, an alkylbenzene, an alkylnaphthalene, and an alicyclic compound; and a natural fat and oil, a polyol ester oil, a phosphate ester, a diester oil, a polyglycol oil, a silicone oil, a polyphenyl ether oil, an alkyldiphenyl ether oil, and a fluorinated oil as a nonhydrocarbon-based synthetic oil.

In addition, examples of the thickening agent include: metal soap-based thickening agents such as aluminum soap, lithium soap, sodium soap, complex lithium soap, complex calcium soap, and complex aluminum soap; and urea-based compounds such as a diurea compound and a polyurea compound. Those thickening agents may be used alone, or two or more kinds thereof maybe used in combination.

As a known additive for the lubricating grease, there are given, for example: an extreme pressure agent; an antioxidant such as an amine-based or a phenol-based antioxidant; a metal deactivator such as benzotriazole; a viscosity index improver such as a polymethacrylate or a polystyrene; and a solid lubricant such as molybdenum disulfide or graphite. Those additives may be used alone, or two or more kinds thereof may be used in combination.

In the retainer 25, a PCD of the pocket 39 is set smaller than a PCD of the ball 24 to be received in the pocket 39. That is, as illustrated in FIGS. 1 and 2, when $P_{PCD}$ represents the PCD of the pocket and $B_{PCD}$ represents the PCD of the ball, a relation $P_{PCD}<B_{PCD}$ is satisfied. In this case, when the PCD of the pocket 39 is 0.9 to 0.99 times as large as the PCD of the ball (when $P_{PCD}=0.9B_{PCD}$ to $0.99B_{PCD}$), a diameter $D_P$ of the pocket is 1.06 times or less as large as a diameter $D_B$ of the ball, and the diameter $D_P$ of the pocket is 1.03 times or more as large as the diameter $D_B$ of the ball.

Figure 5:
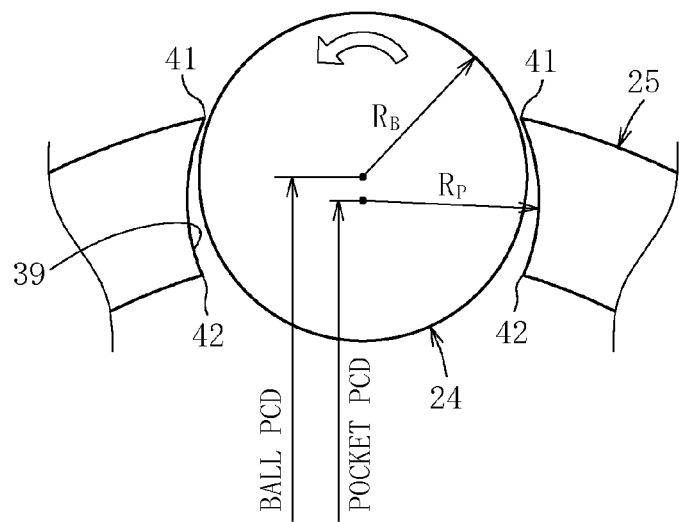
[FIG. 5] A simplified diagram for illustrating a relationship between the retainer and a ball.

As illustrated in FIG. 5, the PCD of the pocket refers to a length (diameter) that is twice as large as a length (radius) between a curvature center ($R_P$) of the pocket of the retainer and a center of the bearing. Further, the PCD of the ball refers to a length (diameter) that is twice as large as a length (radius) between a center ($R_B$) of the ball and the center of the bearing. The above-mentioned relationship is established between the ball 24 and the pocket 39, and thus in a case where the retainer is viewed from the claw portions 38 side as illustrated in FIG. 1, each pocket 39 can be situated on the radially inner side of the bearing with respect to the ball 24. With this configuration, as illustrated in FIG. 5, pocket edge portions 41 situated on the radially outer side of the pocket are close to the ball 24 (the ball 24 is held on the radially outer side of the pocket), and hence can scrape off the grease that adheres to the ball 24. Note that, pocket edge portions 42 situated on the radially inner side of the pocket are separate from the ball 24, and hence are less likely to scrape off the grease that adheres to the ball 24. A hollow arrow of FIG. 5 indicates a rotating direction of the ball 24.

According to the present invention, the pocket edge portions 41 situated on the radially outer side of the pocket are close to the ball (the ball is held on the radially outer side of the pocket), and hence can scrape off the grease that adheres to the ball 24. Accordingly, it is possible to obtain an effect of reducing torque even in grease lubrication. Note that, the pocket edge portions 42 situated on the radially inner side of the pocket are separate from the ball 24, and hence are less likely to scrape off the grease. Accordingly, leakage of the grease is less likely to occur.

When the PCD of the pocket is 0.9 to 0.99 times as large as the PCD of the ball, it is preferred that the diameter of the pocket be 1.06 times or less as large as the diameter of the ball. Further, when the PCD of the pocket is 0.9 to 0.99 times as large as the PCD of the ball, it is preferred that the diameter $D_P$ of the pocket be 1.03 times or more as large as the diameter $D_B$ of the ball. When the diameter of the pocket is 1.06 times or less as large as the diameter $D_B$ of the ball, a backlash can be reduced, and hence it is possible to obtain highly accurate rotation. When the diameter of the pocket is 1.03 times or more as large as the diameter of the ball, there is no risk of abnormal abrasion and increase in stress, and hence it is possible to obtain stable rotation for a long period of time.

Figure 6:
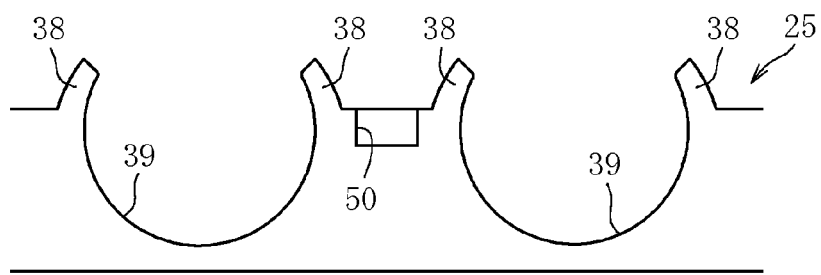
[FIG. 6] A simplified developed view of the retainer in which a grease reservoir is formed on a side provided with claw portions.
Figure 7A:
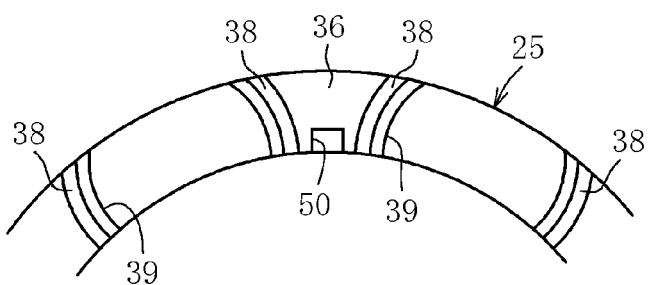
[FIG. 7A] A simplified plan view of a main part of the retainer in which the grease reservoir is formed on a radially inner side thereof, for illustrating the retainer in which the grease reservoir is formed on the side provided with the claw portions.
Figure 7B:
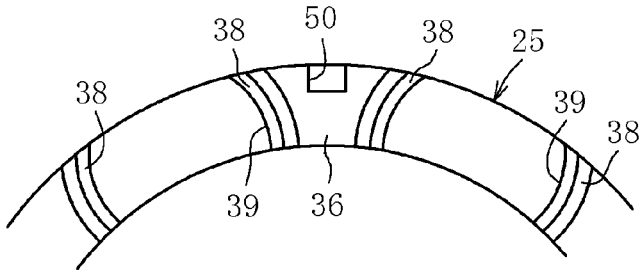
[FIG. 7B] A simplified plan view of a main part of the retainer in which the grease reservoir is formed on a radially outer side thereof, for illustrating the retainer in which the grease reservoir is formed on the side provided with the claw portions.
Figure 7C:
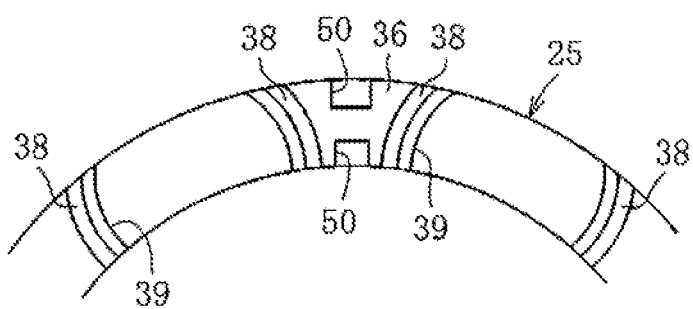
[FIG. 7C] A simplified plan view of a main part of the retainer in which the grease reservoirs are formed on the radially inner side and the radially outer side thereof, for illustrating the retainer in which the grease reservoirs are formed on the side provided with the claw portions.

By the way, as illustrated in FIG. 6, it is preferred that the retainer 25 comprise a grease reservoir 50 for collecting the grease scraped off by the pocket edge portions 41. The grease reservoir 50 is formed into a recess. FIG. 6 illustrates the grease reservoir 50 formed on one axial end surface 36 side of the retainer body 35, on which the claw portions 38 are provided, in a portion between the pockets 39 adjacent to each other in the peripheral direction. In this case, the grease reservoir 50 may be formed on the radially inner side of the portion between the pockets 39 as illustrated in FIG. 7A, or maybe formed on the radially outer side thereof as illustrated in FIG. 7B. In addition, as shown in FIG. 7C, the grease reservoir 50 may be formed on each of the radially inner side and the radially outer side of the portion between the pockets 39.

Figure 9C:
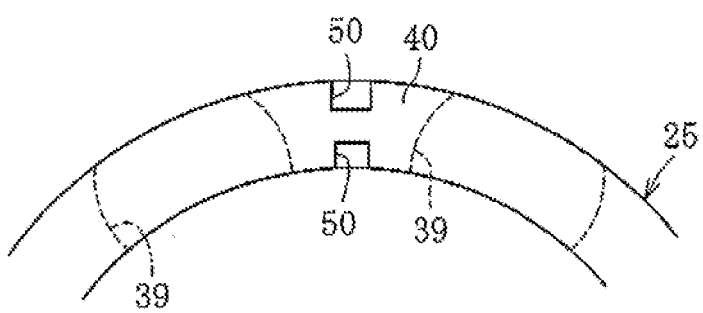
[FIG. 9C] A simplified plan view of a main part of the retainer in which the grease reservoirs are formed in the radially inner side and the radially outer side thereof, for illustrating the retainer in which the grease reserviors are formed on the side provided with no claw portions.
Figure 8:
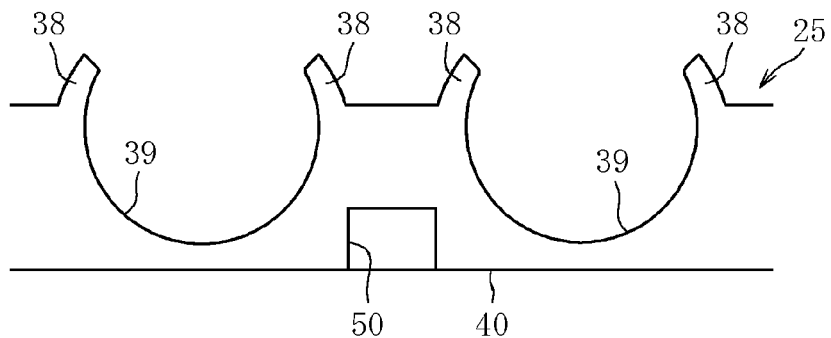
[FIG. 8] A simplified developed view of the retainer in which the grease reservoir is formed on a side provided with no claw portions.
Figure 9A:
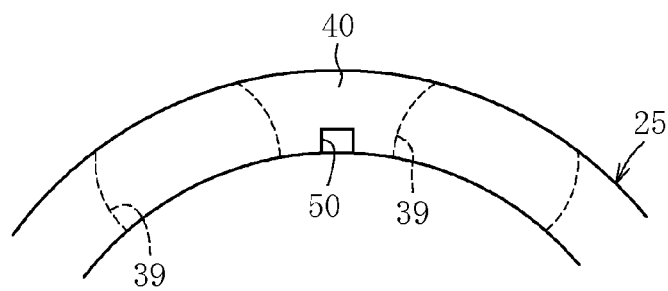
[FIG. 9A] A simplified plan view of a main part of the retainer in which the grease reservoir is formed on the radially inner side thereof, for illustrating the retainer in which the grease reservoir is formed on the side provided with no claw portions.
Figure 9B:
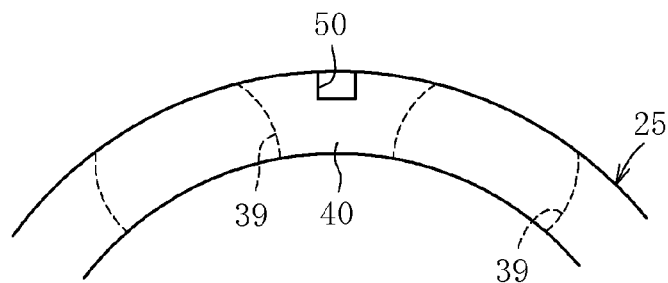
[FIG. 9B] A simplified plan view of a main part of the retainer in which the grease reservoir is formed on the radially outer side thereof, for illustrating the retainer in which the grease reservoir is formed on the side provided with no claw portions.

FIG. 8 illustrates the grease reservoir 50 formed on another axial end surface 40 side of the retainer body 35, on which no claw portions 38 are provided, in a portion between the pockets 39 adjacent to each other in the peripheral direction. Also in this case, the grease reservoir 50 may be formed on the radially inner side of the portion between the pockets 39 as illustrated in FIG. 9A, or may be formed on the radially outer side thereof as illustrated in FIG. 9B. In addition, as shown in FIG. 9C, the grease reservoir 50 may be formed on each of the radially inner side and the radially outer side of the portion between the pockets 39.

Thus, the grease reservoir 50 is formed, and hence the grease is collected in the grease reservoir 50, with the result that it is possible to reduce a flow of the grease to the raceway surfaces 22a, 23a, which is caused by the rolling elements (balls) 24. In this manner, stirring resistance of the grease can be reduced, and hence further reduction in torque can be achieved.

By the way, various changes can be made to a size of the grease reservoir 50 depending on a size of the retainer itself, a material for use, and the like. In this case, when the grease reservoir 50 is extremely large, the retainer is inferior in strength. When the grease reservoir 50 is extremely small, the grease reservoir collects only a small amount of the grease, and hence it is impossible to reduce the flow of the grease to the raceway surfaces 22a, 23a. Accordingly, various changes can be made as long as the retainer is not inferior in strength and the flow of the grease can be reduced.

The embodiment of the present invention is described above. The present invention is not limited to the above-mentioned embodiment, and various modifications can be made thereto. For example, the above-mentioned embodiment exemplifies seven pockets 39 for retaining the balls 24, but the number of the pockets can be increased or reduced arbitrarily. Further, when the grease reservoir 50 is formed, the grease reservoir 50 is formed in a portion between the pockets adjacent to each other in the peripheral direction in each case of forming the grease reservoir 50 on the radially inner side of the retainer and on the radially outer side of the retainer. The grease reservoirs 50 may be formed in all portions between the pockets, or may be formed in arbitrary portions between the pockets.

Further, a thinning groove maybe formed in the another axial end surface 40. The thinning groove is formed to equalize a cooling rate at the time of forming the retainer, to thereby prevent occurrence of a void (empty space formed in an inside of a molded product), sink marks (shrinkage strain that appears on an outer surface of a molded product), warpage, and the like.

The retainer 25 may be made of a metal such as carbon steel, spring steel, and stainless steel. The metal retainer 25 is formed by cutting, etc. As in the above-mentioned embodiment, the resin retainer 25 is formed by injection molding, etc.

EXAMPLE 1

Figure 10:
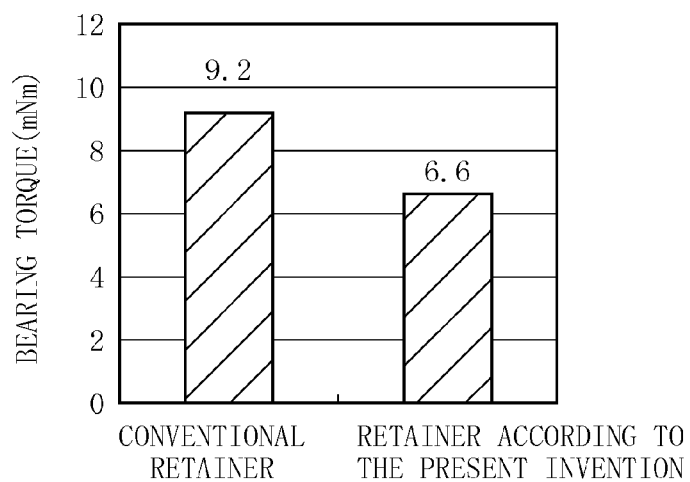
[FIG. 10] A graph showing results of torque measurement of a conventional product and a product according to the present invention.
Figure 11:
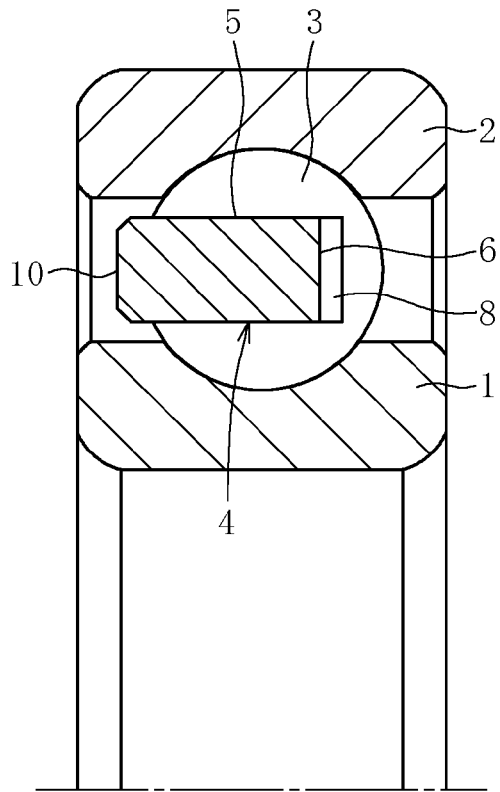
[FIG. 11] A cross-sectional view of a conventional ball bearing.
Figure 12:
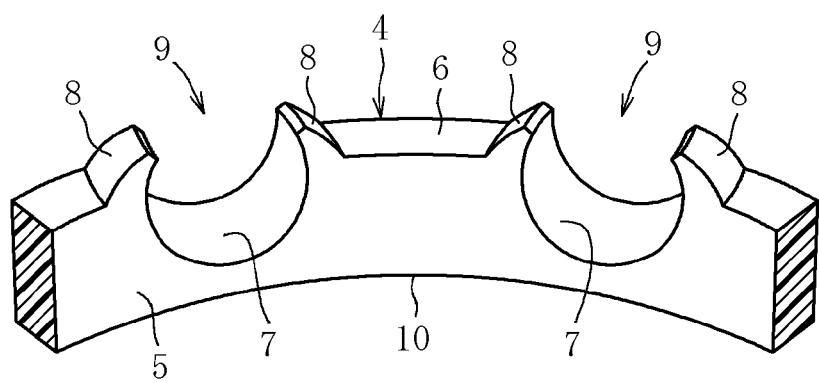
[FIG. 12] A perspective view of a main part of a conventional retainer for a ball bearing.
Figure 13:
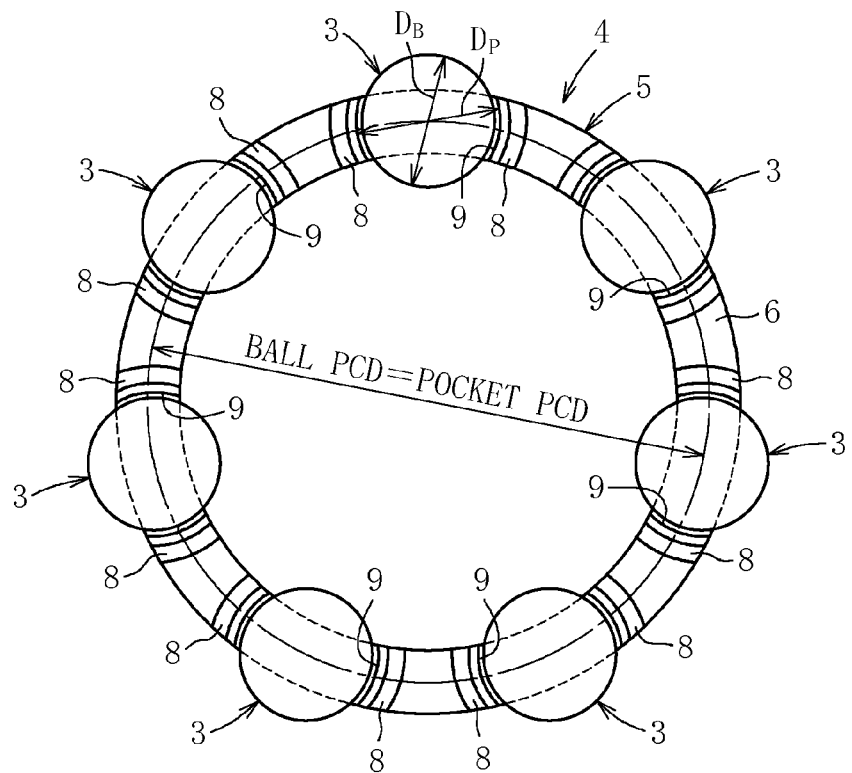
[FIG. 13] A plan view of the conventional retainer for a ball bearing.
Figure 14:
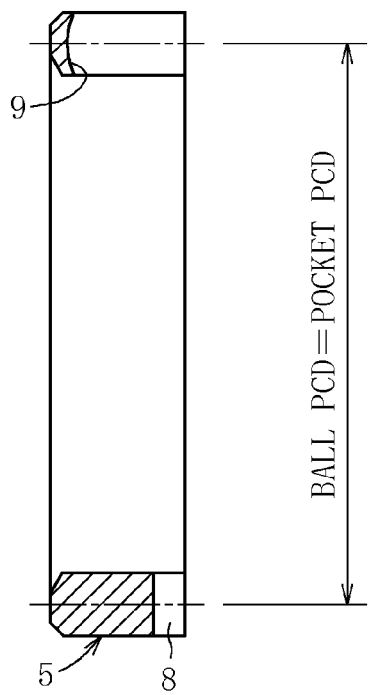
[FIG. 14] A cross-sectional view of the conventional retainer for a ball bearing.
Figure 15:
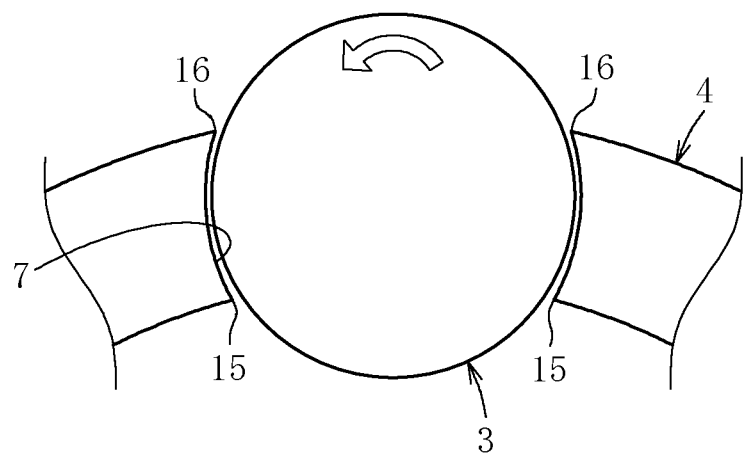
[FIG. 15] A simplified diagram for illustrating a relationship between the conventional retainer and a ball.

Next, regarding torque, comparison was made between a ball bearing (conventional product) using a conventional retainer in which a PCD of a pocket and a PCD of a ball were equal, and a ball bearing (product according to the present invention) using a retainer in which a PCD of a pocket was set smaller than a PCD of a ball to be received in the pocket 39. A "6203LLB" bearing manufactured by NTN Corporation was used as the bearings, and an "ME-1" grease manufactured by NIPPON GREASE CO., LTD. was used as a grease. Further, an rpm was set to 1000 r/min, a load Fa was set to 29.4 N, and ambient temperature was set to room temperature. A difference between the PCD of the pocket and the PCD of the ball of the product according to the present invention was set to 0.7 mm. FIG. 10 shows results of torque measurement. As is understood from FIG. 10, the product according to the present invention can obtain the effect of reducing torque even in grease lubrication.

INDUSTRIAL APPLICABILITY

According to the ball bearing of the present invention, which uses the retainer of the present invention, it is possible to provide a ball bearing capable of obtaining the effect of reducing torque even in grease lubrication. Therefore, the ball bearing of the present invention is most suitable as a ball bearing built into a fan coupling device, an alternator, an idler pulley, an electromagnetic clutch for a car air-conditioner, an electric fan motor, and the like.

REFERENCE SIGNS LIST 35 retainer body
36 one axial end surface
37 recess
38 claw portion
39 pocket
40 other axial end surface
50 grease reservoir

The invention claimed is:
1. A ball bearing comprising:
an inner race;
an outer race;
a plurality of balls interposed between the inner race and the outer race; and
a retainer for retaining the balls, the retainer comprising an annular retainer body including:
a plurality of recesses formed in one axial end surface of the annular retainer body along a peripheral direction at predetermined pitches; and
a pair of claw portions protruding from opening ends of each of the recesses, the opening ends of each of the recesses being opposed to each other in the peripheral direction,
wherein the each of the recesses and the corresponding pair of claw portions form a pocket in which a ball of the plurality of balls is received,
wherein pocket edge portions of the pockets situated on a radially outer side of the pockets are closer to the balls than pocket edge portions of the pockets situated on a radially inner side of the pockets, whereby a curvature center of the pockets is situated on the radially inner side of the pockets and not at a center of thickness of the retainer, and a pitch circle diameter (PCD) of the pockets, which has a length that is twice as large as a length between the curvature center of one of the pockets and a center of the ball bearing, is smaller than a PCD of the balls, which has a length that is twice as large as a length between a center of one of the balls and the center of the ball bearing, so that the pocket edge portions situated on the radially outer side of the pockets are positioned to scrape off grease that adheres to the balls, and
wherein when the PCD of the pockets is 0.9 to 0.99 times as large as the PCD of the balls, a diameter of the pockets is 1.06 times or less as large as a diameter of the balls.

2. A ball bearing according to claim 1, wherein when the PCD of the pockets is 0.9 to 0.99 times as large as the PCD of the balls, the diameter of the pockets is 1.03 times or more as large as the diameter of the balls.

3. A ball bearing according to claim 2, wherein the annular retainer body further includes a grease reservoir formed on the one axial end surface side, on which the pairs of claw portions are provided, at a position on a radially inner side of a portion between an adjacent pair of the pockets along the peripheral direction.

4. A ball bearing according to claim 2, wherein the annular retainer body further includes a grease reservoir formed on the one axial end surface side, on which the pairs of claw portions are provided, at a position on a radially outer side of a portion between an adjacent pair of the pockets along the peripheral direction.

5. A ball bearing according to claim 2, wherein the annular retainer body further includes a plurality of grease reservoirs formed on the one axial end surface side, on which the pairs of claw portions are provided, at positions on a radially inner side and a radially outer side of a portion between an adjacent pair of the pockets along the peripheral direction.

6. A ball bearing according to claim 2, wherein the annular retainer body further includes a grease reservoir formed on another axial end surface side, on which no claw portions are provided, at a position on a radially inner side of a portion between an adjacent pair of the pockets along the peripheral direction.

7. A ball bearing according to claim 2, wherein the annular retainer body further includes a grease reservoir formed on another axial end surface side, on which no claw portions are provided, at a position on a radially outer side of a portion between an adjacent pair of the pockets along the peripheral direction.

8. A ball bearing according to claim 2, wherein the annular retainer body further includes a plurality of grease reservoirs formed on another axial end surface side, on which no claw portions are provided, at positions on a radially inner side and a radially outer side of a portion between an adjacent pair of the pockets along the peripheral direction.

9. A ball bearing according to claim 2, wherein the retainer is made of PA66.

10. A ball bearing according to claim 2, wherein the retainer is made of PA46.

11. A ball bearing according to claim 2, wherein the retainer is made of PA9T.

12. A ball bearing according to claim 2, wherein the retainer is made of PA11.

13. A ball bearing according to claim 2, wherein the retainer is made of PA6.

14. A ball bearing according to claim 1, wherein the annular retainer body further includes a grease reservoir formed on the one axial end surface side, on which the pairs of claw portions are provided, at a position on a radially inner side of a portion between an adjacent pair of the pockets along the peripheral direction.

15. A ball bearing according to claim 1, wherein the annular retainer body further includes a grease reservoir formed on the one axial end surface side, on which the pairs of claw portions are provided, at a position on a radially outer side of a portion between an adjacent pair of the pockets along the peripheral direction.

16. A ball bearing according to claim 1, wherein the annular retainer body further includes a plurality of grease reservoirs formed on the one axial end surface side, on which the pairs of claw portions are provided, at positions on a radially inner side and a radially outer side of a portion between an adjacent pair of the pockets along the peripheral direction.

17. A ball bearing according to claim 1, wherein the annular retainer body further includes a grease reservoir formed on another axial end surface side, on which no claw portions are provided, at a position on a radially inner side of a portion between an adjacent pair of the pockets along the peripheral direction.

18. A ball bearing according to claim 1, wherein the annular retainer body further includes a grease reservoir formed on another axial end surface side, on which no claw portions are provided, at a position on a radially outer side of a portion between an adjacent pair of the pockets along the peripheral direction.

19. A ball bearing according to claim 1, wherein the annular retainer body further includes a plurality of grease reservoirs formed on another axial end surface side, on which no claw portions are provided, at positions on a radially inner side and a radially outer side of a portion between an adjacent pair of the pockets along the peripheral direction.

20. A ball bearing according to claim 1, wherein the retainer is made of PA66.

21. A ball bearing according to claim 1, wherein the retainer is made of PA46.

22. A ball bearing according to claim 1, wherein the retainer is made of PA9T.

23. A ball bearing according to claim 1, wherein the retainer is made of PA11.

24. A ball bearing according to claim 1, wherein the retainer is made of PA6.

* * * * *